(12) United States Patent
Grinberg et al.

(10) Patent No.: US 9,619,249 B2
(45) Date of Patent: Apr. 11, 2017

(54) FLEXIBLE FIXED-CONTENT DYNAMICALLY CHANGEABLE WALL MODULE USER INTERFACE

(71) Applicant: Honeywell International Inc., Morristown, NJ (US)

(72) Inventors: Paul Grinberg, Minneapolis, MN (US); Miroslav Mikulica, Brno (CZ); Ralph C. Brindle, Edina, MN (US); Paul C. Wacker, Plymouth, MN (US)

(73) Assignee: Honeywell International Inc., Morris Plains, NJ (US)

( * ) Notice: Subject to any disclaimer, the term of this patent is extended or adjusted under 35 U.S.C. 154(b) by 492 days.

(21) Appl. No.: 14/199,662

(22) Filed: Mar. 6, 2014

(65) Prior Publication Data

US 2015/0254799 A1 Sep. 10, 2015

(51) Int. Cl.
*G06F 9/44* (2006.01)
(52) U.S. Cl.
CPC .................................. *G06F 9/4443* (2013.01)
(58) Field of Classification Search
CPC ...................................................... G06F 9/4443
See application file for complete search history.

(56) References Cited

U.S. PATENT DOCUMENTS

| | | | |
|---|---|---|---|
| 5,343,474 A | 8/1994 | Driscoll | |
| 5,748,929 A | 5/1998 | Conrad et al. | |
| 6,651,106 B1 | 11/2003 | Driscoll | |
| 2005/0040248 A1* | 2/2005 | Wacker | F24F 11/0086 236/51 |
| 2005/0138656 A1* | 6/2005 | Moore | H04N 7/165 725/45 |

* cited by examiner

*Primary Examiner* — Jacinta M Crawford
*Assistant Examiner* — Jonathan M Cofino
(74) *Attorney, Agent, or Firm* — Seager, Tufte & Wickhem, LLP

(57) ABSTRACT

A wall module user interface having a memory with a table driven structure. The structure may incorporate an objects table subject to a dynamic object table capable of rendering display objects such as labels or button icons based on arbitrary comparison conditions against the value of a variable at run time. Also, the structure may incorporate a screen actions table subject to a dynamic actions table to similarly determine an action of the user interface based on arbitrary comparison conditions against the value of a variable. An action may be, for example, going to a next screen, where the next screen is determined by the value of the variable at run time.

15 Claims, 5 Drawing Sheets

Objects Table:

FIGURE 3a

| Row | Object type | Object Parameter | Location | Font | Justify (L/C/R) | Comment |
|---|---|---|---|---|---|---|
| 0 | Label | Label ID | x0, y0, w0, h0 | 0 | C | Soft key 1 label |
| 1 | Dynamic | Dynamic object ID = 0 | x1, y1, w1, h1 | 0 | C | Soft key 2 label |
| 2 | Enumerated | Enum ID | x2, y2, w2, h2 | 0 | L | FAN symbol |
| 3 | Dynamic | Dynamic object ID | x3, y3, w3, h3 | 0 | L | OCC/OVR symbol |
| 4 | Dynamic | Dynamic object ID | x4, y4, w4, h4 | 1 | R | Temperature setpoint |
| 5 | Enumerated | Enum ID | x5, y5, w5, h5 | 0 | L | SET label |
| 6 | Dynamic | Dynamic object ID | x6, y6, w6, h6 | 0 | L | UNIT symbol |
| ... | | | | | | |

— 31

Dynamic object 0 is defined here — 32

Dynamic Objects Table:

FIGURE 3b

| Row | Spare bits | Local PVID | # of Items | Items Offset |
|---|---|---|---|---|
| 0 | 0 | SK2_LABEL_PVID | 3 | 0 |
| 1 | 0 | Dynamic object 1 PVID | 3 | 4 |
| ... | | | | |

Dynamic object 0 items are defined here — 33

3 items, 1st start at row 0

Dynamic Objects Items Table:

FIGURE 3c

| Row | Condition | Value | Object type | Object Parameter |
|---|---|---|---|---|
| 0 | "<" | 2 | Label | "MORE" label ID |
| 1 | "=" | 2 | Label | "OVERRIDE" label ID |
| 2 | ">" | 3 | Label | "CANCEL_OVR" label ID |
| ... | | | | |

ScreenActionsTable:

| Row | Input Event | Next Screen | Action | Action Parameter | ... | Comment |
|---|---|---|---|---|---|---|
| 0 | Soft key 1 pressed | Param Edit Screen | Edit Parameter | FAN PVID | | Screen 1 Action 0 |
| 1 | Soft key 2 pressed | 0 | Dynamic Action | Dynamic Action 0 | | Screen 1 Action 1 |
| 2 | Up Key pressed | Param View Screen | Scroll Up | 0xFF | | Screen 2 Action 0 |
| 3 | System Timeout | Param View Screen | Scroll Down | 0xFF | | Screen 2 Action 3 |
| ... | | | | | | |

FIGURE 4a

Soft key 1 has assigned dynamic action that is defined here

DynamicActionsTable:

| Row | Spare bits | Local PVID | Offset | # of Items | Comment |
|---|---|---|---|---|---|
| 0 | 0 | OVR_ENABLED | 0 | 2 | Dynamic Action 0 |
| 1 | 0 | OVERRIDE | 2 | 2 | Dynamic Action 1 |
| 2 | 0 | FAN | 3 | 2 | Dynamic Action 2 |
| ... | | | | | |

These attributes tell where the dynamic action items are defined

FIGURE 4b

One of these action will be selected at runtime based on the OVR_ENABLED PVID value DynamicActionItemsTable:

| Row | Next Screen | Action | Action Parameter | Condition | Value | ... | Comment |
|---|---|---|---|---|---|---|---|
| 0 | Parameter Edit Screen | Edit Parameter | FAN Parameter ID | "=" | 1 | | Dynamic Action 0 Item 0 |
| 1 | Parameter View Screen | Show Category | Setpoints category index | "=" | 0 | | Dynamic Action 0 Item 1 |
| 2 | Parameter View Screen | Show Category | Tenant menu category index | "<" | 10 | | Dynamic Action 1 Item 0 |
| ... | | | | | | | |

FIGURE 4c

FLEXIBLE FIXED-CONTENT DYNAMICALLY CHANGEABLE WALL MODULE USER INTERFACE

BACKGROUND

The present disclosure pertains to wall modules and particularly to the modules for building systems. More particularly, the disclosure pertains to interfaces for such modules.

SUMMARY

The disclosure may reveal a flexible fixed-content dynamically changeable wall module user interface having a memory with a table driven structure. The structure may incorporate an objects table subject to a dynamic object table capable of rendering display objects such as labels or button icons based on arbitrary comparison conditions against the value of a variable at run time. Also, the structure may incorporate a screen actions table subject to a dynamic actions table to similarly determine an action of the user interface based on arbitrary comparison conditions against the value of a variable. An action may be, for example, going to a next screen, where the next screen is determined by the value of the variable at run time.

BRIEF DESCRIPTION OF THE DRAWING

FIG. 3a is a diagram of an objects table;

FIG. 3b is a diagram of a dynamic objects table;

FIG. 3c is a diagram of a dynamic object items table;

FIG. 4a is a diagram of a screen actions table;

FIG. 4b is a diagram of a dynamic actions table; and

FIG. 4c is a diagram of a dynamic action items table.

DESCRIPTION

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

In commercial HVAC control, customers may use wall modules to interact with their HVAC systems. Historically speaking, this interaction may have been rather limited, thus allowing a cost point to be very low. Over time, the requirements for wall module interactions may have drastically become more demanding and complex, but the cost points seem to have remained the same or become even more restricted.

One way to meet the target costs may be to use microcontrollers with very limited volatile and nonvolatile memory resources such as RAM and flash, respectively. While it is possible to utilize these limited resources to create "fixed application" wall modules, the job may become very difficult when it is desired to have the same wall module run multiple, customer configurable applications, that cannot be fully defined during product design.

Figure 1:
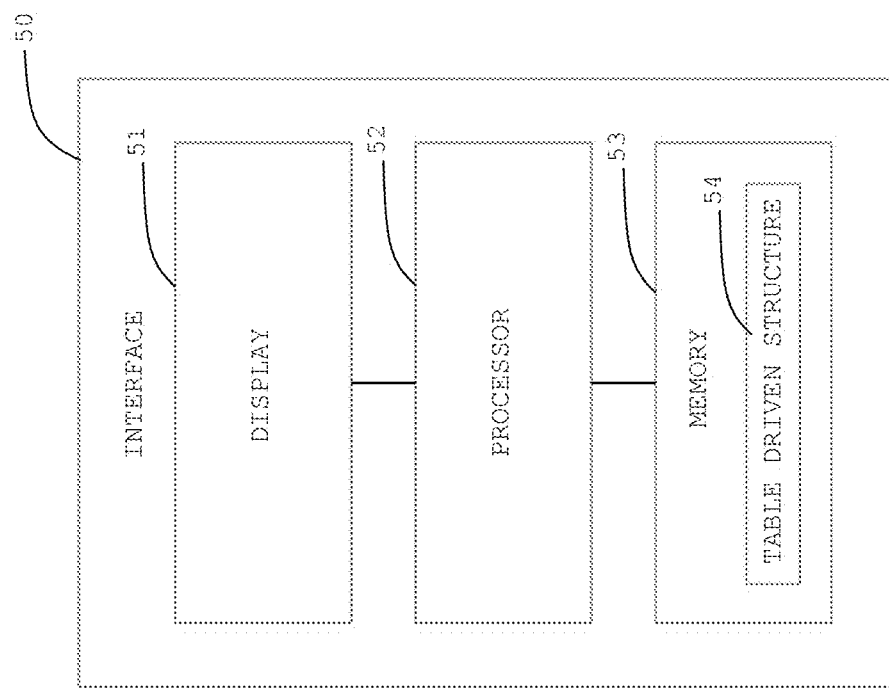
FIG. 1 is a diagram of a basic layout of a flexible fixed-content dynamically changeable wall module user interface.

FIG. 1 is a diagram of a basic layout of a flexible fixed-content dynamically changeable wall module user interface 50. Interface 50 may have a display 51, a memory 53 having a table driven structure 54, and a processor 52 connected to display 51 and memory 53. Interface 50 may have a key board, a mouse control, a touch screen, and/or other mechanism for a user.

The challenge may be addressed by using a table-driven approach to drive both the user display and process inputs from the user. The approach may rely on the fact that firmware can very efficiently traverse tables of constant structures. In this way, a behavior of the wall module may be changed by downloading different content into these fixed structures (tables). However, a downfall of this approach is that a download may be needed to implement a change of behavior. In some use cases, the download cycle is not necessarily acceptable to the customer. A more dynamic, yet still memory efficient approach may be desired.

The present approach may build on top of the table-driven approach by using a notion of dynamic objects and dynamic actions (in conjunction with a processor, memory and user interface).

One may consider the case where, for a given application, the display elements need to change at run time. The entire contents of the display may be described by defining various objects (i.e., a label here, a button there, and so on) in a static objects table (FIG. 3a). As the firmware parses the entries in the objects table, it may intrinsically know how to render the static objects. Whenever a need arises to have an object with run time changeable content, the objects table may have an entry for a dynamic object.

In order to render the dynamic objects, the firmware may have to first look in another table (a dynamic objects table—FIG. 3b) for details. The dynamic objects table structure may define details for where to look for the run time trigger (i.e., run time changeable value of another parameter), as well as where to look within another table (i.e., a dynamic object items table—FIG. 3c) to find specifics for how to render the dynamic object for the current values of each of the trigger conditions. In other words, the combination of static table structures with static contents, when considered in conjunction with run time values of parameters, may create a run time dynamic rendering of screen contents.

The same concept may apply for processing user inputs (i.e., button press) into one of many supported actions (i.e., go to next screen, and so forth). It may be possible to use one table (actions table—FIG. 4a) to describe an entire set of user input mappings to their meanings. One of the possible actions may be a dynamic action, which could be described in a dynamic actions table (FIG. 4b) to map the run time trigger condition to the various entries in the dynamic action items table (FIG. 4c).

Figure 2A:
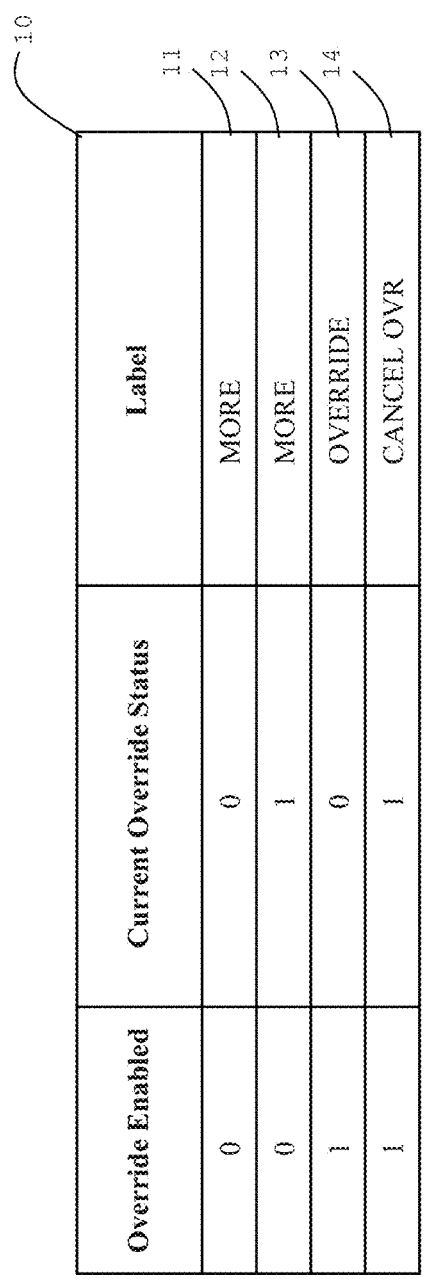
FIG. 2a is a diagram of a table that may define a desired behavior of a label text for each possible combination of an example presented herein.

A dynamic object use example may be noted. One may consider a case where the wall module home screen needs to display one of three labels, based on a value of two run-time selectable parameters called "OVR_ENABLED" and "OVERRIDE" (FIG. 2a). The first parameter, override enabled, may inform whether an override feature is enabled (value 1) or disabled (value 0). Only if the override feature is enabled may the user need to interact with the override status, which could either be override is active (value 1) or inactive (value 0).

The table (FIG. 2*a*) may define the desired behavior of the label text to be associated with a button for each possible combination.

Figure 2B:
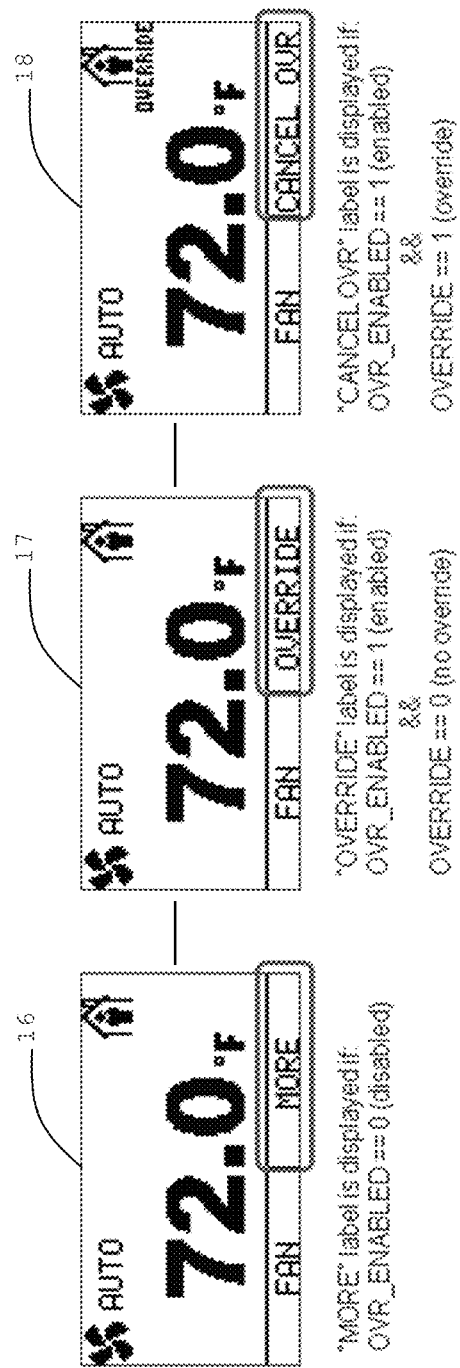
FIG. 2b is a diagram of screens in a display for a device such as a thermostat.

The following information may depict the same desired behavior in a graphical form as in an illustration (FIG. 2*b*). To describe the screen objects, as shown above (FIG. 2*b*), the objects table (FIG. 3*a*) may have entries similar to the table shown in FIG. 3*a*. The second entry (row #1) may be for a dynamic object which represents the label in question. Because the dynamic object ID=0, the processor or microcontroller may know to look at the first row (row #0) of the dynamic objects table (FIG. 3*b*) to get the definition of the dynamic object. This row may have a reference to a parameter called "SK2_LABEL_PVID" which is an internal representation of a composite enumeration variable conveying override enabled and current override status, as well as an indication that details of how to render the dynamic object can be found in rows #0, 1, and 2 of the dynamic object items table (FIG. 3*c*).

A dynamic action use example may be noted. One may consider the same case as in the above example. When the label text is "MORE" (i.e., override enabled is zero), an action corresponding to a button press should be to display a category. Otherwise, the action corresponding to the same button press may be to edit the value of a current override status parameter.

A screen actions table (FIG. 4*a*) may describe a mapping of virtually all legal button presses to all of the possible actions on the home screen. The second action (row #1) may define a mapping between the right button (called soft key 2) and a corresponding dynamic action ID=0. This may be a reference into the dynamic actions table (FIG. 4*b*), where the first row (row #0) defines a linkage between the override enabled parameter and a reference into dynamic action items table rows #0 and 1 (FIG. 4*c*). Each of those rows may further define the mapping of that parameter value to the actual actions.

FIG. 2*a* is a diagram of a table 10 that may define a desired behavior of a label text for each possible combination of the example presented herein. In row 11, an override enabled and current override status may have values 0, respectively, and a label may be "more". In row 12, override enabled and current override status may have value 0 and 1, respectively, and the label may be "more". In row 13, override enabled and current override status may have values 1 and zero, respectively, and the label may be "override". In row 14, override enabled and current override status may have the values 1, and the label "CANCEL OVR".

FIG. 2*b* is a diagram of three screens 16, 17 and 18 of a display for a device such as a thermostat. Screen 16 shows a temperature setting of 72.0 degrees F., a fan symbol with "AUTO", an indoor designation in the upper right portion of the screen and a label at the bottom of screen 16 indicting MORE with a line encircling it to the right of screen 16 and FAN to the left. Below screen 16 is text that may state, "'MORE' label is displayed if: OVR_ENABLED==0 (override is disabled)".

Screen 17 is similar in appearance to screen 16 except the label at the bottom of screen 17 to the right may indicate OVERRIDE with a line encircling it. Below screen 17 is text that may state, "'OVERRIDE' label is displayed if: OVR_ENABLED==1 (override is enabled) && OVERRRIDE==0 (override is not active)".

Screen 18 is similar in appearance of screen 16 except that the label at the bottom of screen 18 to the right may indicate CANCEL OVR with a line encircling it. Below screen 18 is text that appears to state, "'CANCEL OVR' label is displayed if: OVR_ENABLED==1 (override is enabled) && OVERRIDE==1 (override is active)".

FIG. 3*a* is a diagram of an objects table 31 having one or more rows and several columns. The columns may be entitled Row, Object type, Object Parameter, Location, Font, Justify (L/C/R), and Comment, respectively.

FIG. 3*b* is a diagram of a dynamic objects table 32 having one or more rows and several columns. The columns may be entitled Row, Spare bits, Local PVID, # of Items, and Items Offset, respectively.

FIG. 3*c* is a diagram of a dynamic object items table 33 having one or more rows and several columns. The columns may be entitled Row, Condition, Value, Object type, and Object Parameter, respectively.

FIG. 4*a* is a diagram of a screen actions table 41 having one or more rows and several columns. The columns may be entitled Row, Input Event, Next Screen, Action, Action Parameter, . . . , and Comment, respectively.

FIG. 4*b* is a diagram of a dynamic actions table 42 having one or more rows and several columns. The columns may be entitled Row, Spare bits, Local PVID, Offset, # of Items, and Comment, respectively.

FIG. 4*c* is a diagram of a dynamic action items table 43 having one or more rows and several columns. The columns may be entitled Row, Next Screen, Action, Action Parameter, Condition, Value, . . . , and Comment, respectively.

The objects and actions tables 31 and 32 may be noted. The tables may be parsed sequentially—first, Objects Table 31, then Dynamic Objects Table 32, and then Dynamic Object Items Table 33. For an instance of operation, row 1 of table 31 may be looked at. The object type may be dynamic; the object parameter may be a dynamic object ID=0; the location may be x1, y1, w1, h1; the font may be 0; and the justification may be C. A comment may indicate a soft key 2 label. The dynamic object ID=0 (dynamic object 0) of the object parameter column, may be defined in row 0 of table 32. The spare bits may be 0; the local PVID may be SK2_LABEL PVID; the # of items may be 3; and the items offset may be 0.

Dynamic object 0 items may be defined in table 33. The definition of the first of the 3 items, as indicated in table 32, may start at row 0 of table 33. The second and third items may be defined in rows 1 and 2, respectively. Row 0 may reveal a condition "<", a value of 2, an object type of Label and an object parameter of "MORE" label ID for the first item. Row 1 may reveal a condition "==", a value of 2, an object type of Label and an object parameter of "OVERRIDE" label ID or the second item. Row 2 may reveal a condition "==", a value of 3, an object type of Label and an object parameter of "CANCEL OVR" label ID for the third item.

In rendering the label for soft key 2, software may compare the value of the SK2_LABEL_PVID variable against the three options offered in table 33. First, the value may be compared against the specifications in row 0 (the first row identified by table 32). These specifications may indicate a comparison of "<" (less than) against a value of 2. If this comparison succeeds (the variable value is less than 2), the label ID from this row (representing "MORE") may be chosen and rendered. If this comparison fails, one may move on to the next row and its comparison specifications. If one exhausts virtually all the rows specified (in this case three) without a comparison match, a default error object may be rendered. This sequential processing against multiple comparison specifications may allow complex logical tests to be implemented in table form.

For an instance of operation relative to table 41, row 1 may be looked at. The input event may be a soft key 2 pressed; the next screen may be 0; the action may be dynamic action; the action parameter may be dynamic action 0; and the comment may be Screen 1 Action 1. The dynamic action assigned to soft key 2 may be defined in row 0 of table 42 that may be looked at. Spare bits may be 0; local PVID may be OVR_ENABLED; offset may be 0; # of items may be 2; and the comment may indicate Dynamic Action 0. The attributes offset and # of items may tell where the dynamic action items are defined. One of these action items may be selected at runtime based on the OVR_ENABLED PVID value using the same multiple row comparison technique as the dynamic object rendering. A selected item may be at row 0 of table 1, which can be looked at. If the comparison condition of row 0 (condition may be "="; a value may be 1) is satisfied, the next screen may be a parameter edit screen; an action may be edit parameter; an action parameter may be FAN Parameter ID. If the row 0 comparison condition fails, the condition of row 1 may be evaluated, and so on.

One may note the possible recursive nature of the Dynamic tables. For example, Screen Actions Table 41 may refer to a Dynamic id #0. Dynamic Actions Table 41 row #0 may refer to Dynamic Action Items #0 and #1 and use a PVID called "X". Based on the runtime value of X, the appropriate row in Dynamic Action Items Table 43 may be #0, which does not immediately resolve to an action, but rather may specify another Dynamic id #1. Dynamic Actions Table 41 row #1 may refer to Dynamic Action Items #2 and #3 and use a PVID called "Y". Based on the runtime value of Y, the appropriate row in Dynamic Action Items Table 43 may be #2, which does not immediately resolve to an action, but rather may specify another Dynamic id #2. This approach may continue until eventually the Dynamic Action Items Table 41 resolves to an actual action.

To recap, a flexible fixed-content dynamically changeable wall module user interface may incorporate a processor for a heating, ventilation and air conditioning system, a display connected to the processor, and a memory connected to the processor. The memory may incorporate a table driven structure using dynamic objects and dynamic actions. The table driven structure may incorporate an objects table subject to a dynamic objects table and in turn to a dynamic object items table, and a screen actions table subject to a dynamic actions table and in turn a dynamic action items table.

Contents of a screen shown on the display may be defined as objects in the objects table. If an object needs runtime changeable content, the dynamic objects table may have an entry for a dynamic object. To render the dynamic object, firmware may look in the dynamic objects table for details. A structure of the dynamic objects table may define details for where to look for a run time trigger and where to look within the dynamic object items table to find specifics on how to render a dynamic object for each trigger condition.

A combination of a static objects table structure with static contents, when considered with run time values of parameters, may create a run time dynamic rendering of screen contents.

The actions table may describe virtually an entire set of user input mappings to their meanings. One action may be a dynamic action which can be described in the dynamic actions table to map a run time trigger condition to entries in the dynamic action items table.

The screen may display a label selected from several labels, based on values of run-time selectable parameters. The label may represent a feature.

One or more parameters in conjunction with one or more other parameters may determine a dynamic nature of a feature to be displayed. Determination of a dynamic nature of the feature may continue until the feature is identified in a dynamic object items table.

A desired behavior of label text for each combination may be defined in a static table.

An objects table may have entries. An entry in the objects table may be for a dynamic object, which represents a label in question.

An object parameter may indicate where to look in the dynamic objects table to get a definition of the dynamic object. A row indicated may have a reference to a parameter and details of how to render the dynamic object. The details may show where information about rendering the dynamic object is in the dynamic object items table.

A dynamically changeable wall module system may incorporate a processor, a display connected to the processor, and a memory connected to the processor. The memory may incorporate a table driven structure using dynamic objects and dynamic actions. The table driven structure may incorporate an objects table subject to a dynamic objects table and a dynamic object items table, and a screen actions table subject to a dynamic actions table and a dynamic action items table.

There may be a mapping of virtually all button presses to all possible actions on a screen of the display. A particular action may define a mapping between a certain button and a corresponding dynamic action having an identification. The identification may be a reference into the dynamic actions table which in turn defines a linkage between a parameter and a reference into the dynamic action items table. One or more rows referred by the reference into the dynamic action items table may define a mapping of a value of the parameter to the dynamic action.

An approach for attaining a dynamically changeable wall module user interface may incorporate providing a processor, providing a display connected to the processor, and providing a memory connected to the processor. The memory may incorporate a table driven structure using dynamic objects and structures.

The table driven structure may incorporate an objects table subject to a dynamic objects table and a dynamic object items table, and a screen actions table subject to a dynamic actions table and a dynamic action items table.

Contents of a screen shown on the display may be defined as objects in the objects table. If an object needs runtime changeable content, the dynamic objects table may have an entry for a dynamic object. To render the dynamic object, firmware may look in the dynamic objects table for details. A structure of the dynamic objects table may define details for where to look for a run time trigger and where to look within the dynamic object items table to find specifics in how to render a dynamic object for each trigger condition.

The screen may display a label selected from several labels, based on values of run-time selectable parameters. The label may represent a feature. The values of the parameters may indicate the functionality of the feature.

An object parameter may indicate where to look in the dynamic objects table to get a definition of the dynamic object. A row indicated may have a reference to a parameter and details of how to render the dynamic object. The details may show where information about rendering the dynamic object is in the dynamic object items table.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A flexible fixed-content dynamically changeable wall module user interface comprising:
    a processor for a heating, ventilation and air conditioning system;
    a display connected to the processor; and
    a memory connected to the processor; and
    wherein:
    the memory comprises a table driven structure using dynamic objects and dynamic actions;
    the table driven structure comprises:
        an objects table subject to a dynamic objects table and in turn to a dynamic object items table;
        a screen actions table subject to a dynamic actions table and in turn a dynamic action items table;
    contents of a screen shown on the display are defined as objects in the objects table;
    if an object needs runtime changeable content, the dynamic objects table has an entry for a dynamic object;
    to render the dynamic object, firmware looks in the dynamic objects table for details; and
    a structure of the dynamic objects table defines details for where to look for a run time trigger and where to look within the dynamic object items table to find specifics in how to render a dynamic object for each trigger condition.

2. The interface of claim 1, wherein a combination of a static objects table structure with static contents, when considered with run time values of parameters, can create a run time dynamic rendering of screen contents.

3. The interface of claim 1, wherein:
    the screen actions table describes virtually an entire set of user input mappings to their meanings; and
    one action is a dynamic action which can be described in the dynamic actions table to map a run time trigger condition to entries in the dynamic action items table.

4. The interface of claim 1, wherein:
    the screen displays a label selected from several labels, based on values of run-time selectable parameters; and
    the label represents a feature.

5. The interface of claim 4, wherein:
    one or more parameters in conjunction with one or more other parameters determine a dynamic nature of a feature to be displayed; and
    determination of a dynamic nature of the feature continues until the feature is identified in a dynamic object items table.

6. The interface of claim 4, wherein a desired behavior of label text for each combination is defined in a static table.

7. The interface of claim 4, wherein:
    the objects table has entries; and
    an entry in the objects table is for a dynamic object, which represents a label in question.

8. The interface of claim 4, wherein:
    an object parameter indicates where to look in the dynamic objects table to get a definition of the dynamic object; and
    a row indicated has a reference to a parameter and details how to render the dynamic object.

9. The interface of claim 8, wherein the details show where information about rendering the dynamic object is in the dynamic object items table.

10. A dynamically changeable wall module system comprising:
    a processor;
    a display connected to the processor; and
    a memory connected to the processor; and
    wherein:
    the memory comprises a table driven structure using dynamic objects and dynamic actions;
    the table driven structure comprises:
        an objects table subject to a dynamic objects table and a dynamic object items table;
        a screen actions table subject to a dynamic actions table and a dynamic action items table;
        a mapping of all button presses to all possible actions on a screen of the display; and
        a particular action defines a mapping between a certain button and a corresponding dynamic action having an identification.

11. The system of claim 10, wherein the identification is a reference into the dynamic actions table which in turn defines a linkage between a parameter and a reference into the dynamic action items table.

12. The system of claim 11, wherein one or more rows referred by the reference into the dynamic action items table define a mapping of a value of the parameter to the dynamic action.

13. A method for attaining a dynamically changeable wall module user interface comprising:
    providing a processor;
    providing a display connected to the processor; and
    providing a memory connected to the processor; and
    wherein:
    the memory comprises a table driven structure using dynamic objects and structures;
    the table driven structure comprises:
        an objects table subject to a dynamic objects table and a dynamic object items table;
        a screen actions table subject to a dynamic actions table and a dynamic action items table;
    contents of a screen shown on the display are defined as objects in the objects table;
    if an object needs runtime changeable content, the dynamic objects table has an entry for a dynamic object;
    to render the dynamic object, firmware looks in the dynamic objects table for details; and
    a structure of the dynamic objects table defines details for where to look for a run time trigger and where to look within the dynamic object items table to find specifics in how to render a dynamic object for each trigger condition.

14. The method of claim 13, wherein:
    the screen displays a label selected from several labels, based on values of run-time selectable parameters;
    the label represents a feature; and
    the values of the parameters indicate the functionality of the feature.

15. The method of claim 14, wherein:
an object parameter indicates where to look in the dynamic objects table to get a definition of the dynamic object;
a row indicated has a reference to a parameter and details how to render the dynamic object; and
the details show where information about rendering the dynamic object is in the dynamic object items table.

\* \* \* \* \*